UNITED STATES PATENT OFFICE.

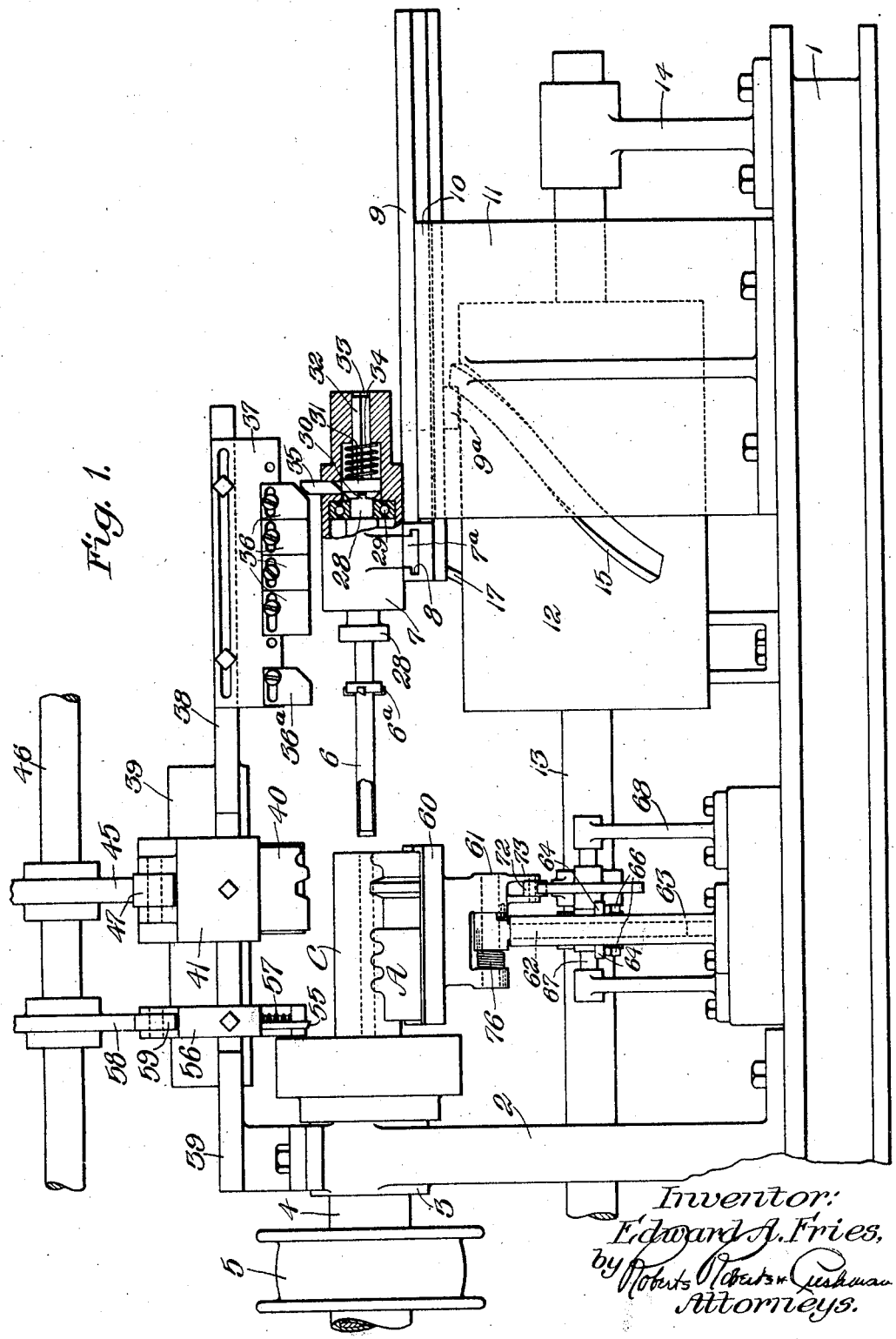

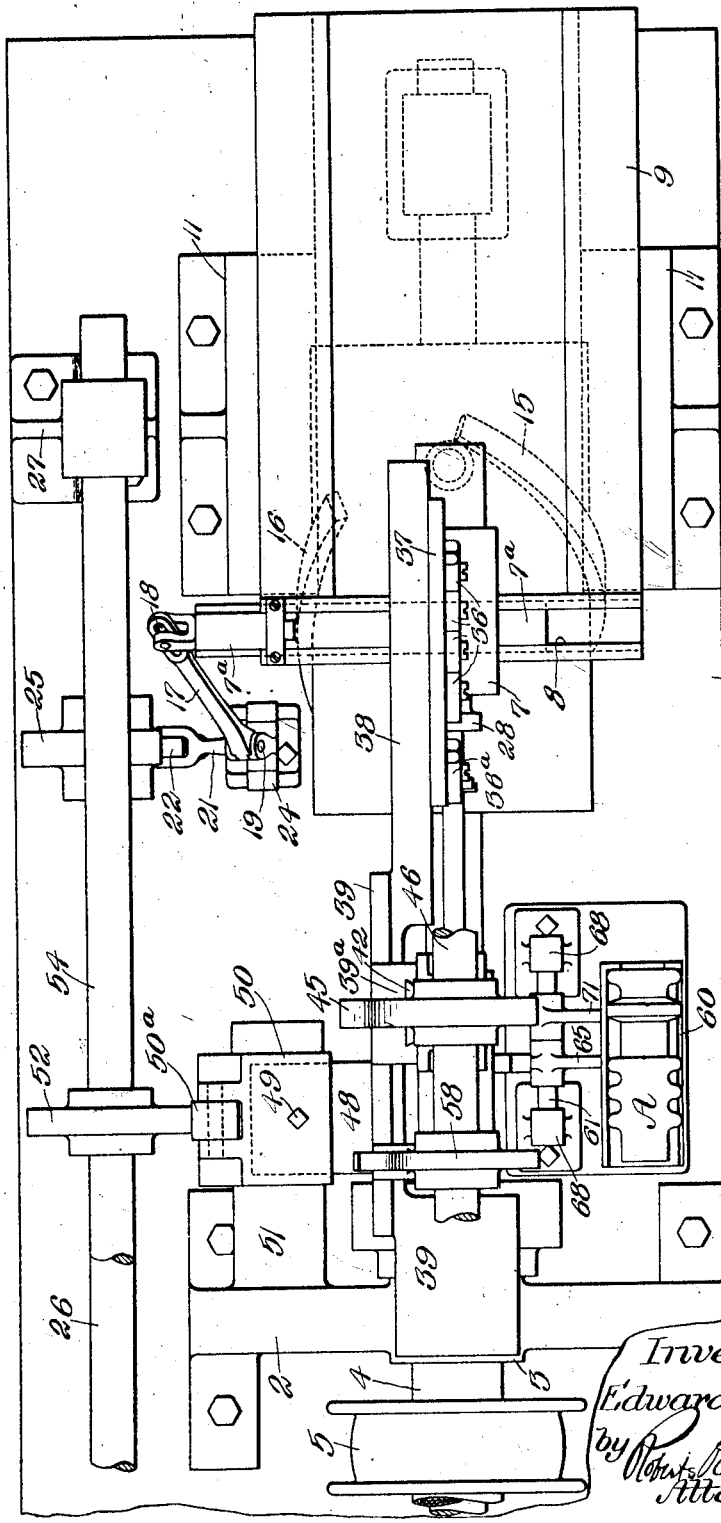

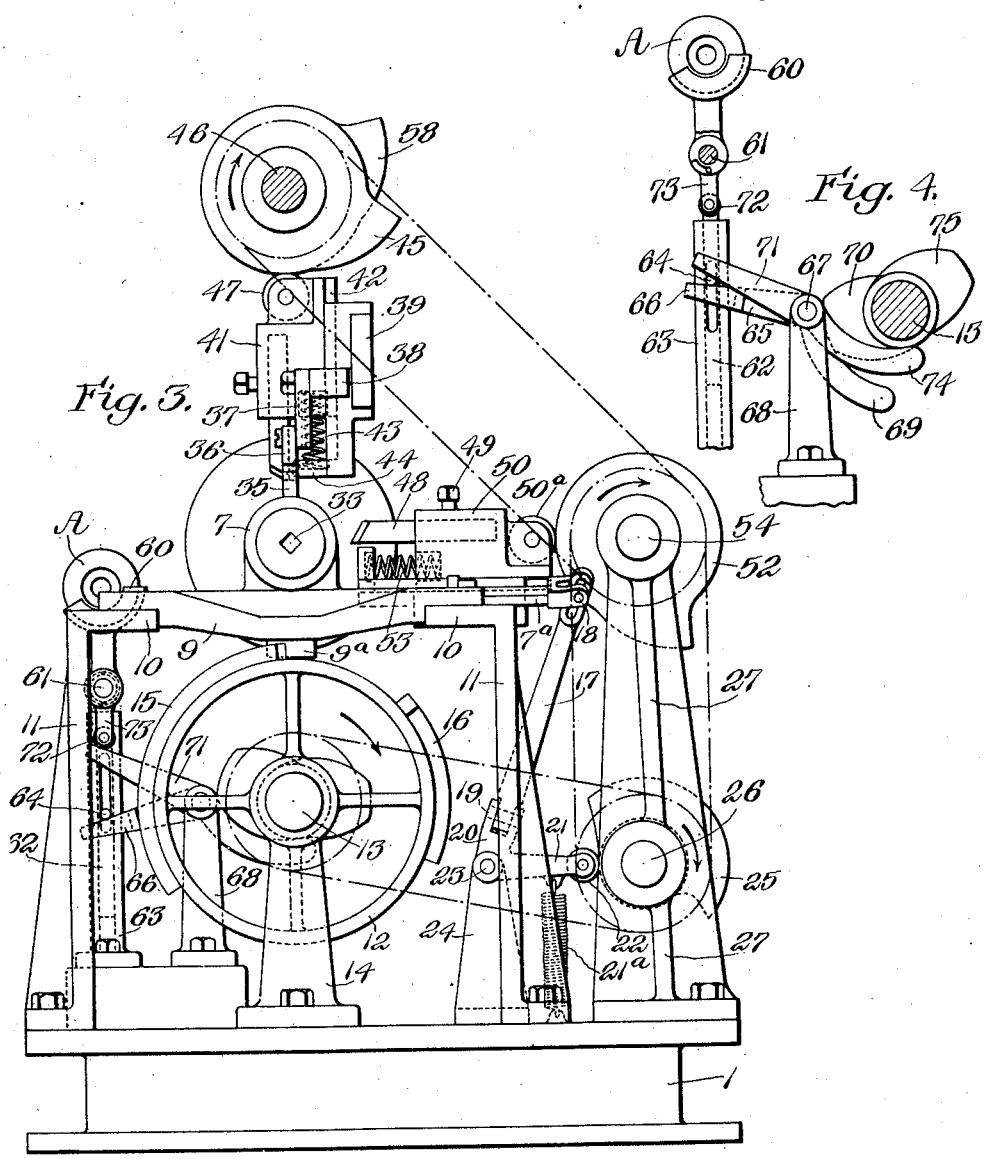

EDWARD A. FRIES, OF BOSTON, MASSACHUSETTS, ASSIGNOR TO RANDALL & FRIES, OF BOSTON, MASSACHUSETTS, A COPARTNERSHIP CONSISTING OF LILLIAN L. RANDALL AND EDWARD A. FRIES.

MACHINE FOR TURNING PLASTIC MATERIAL.

1,352,443.

Specification of Letters Patent.  Patented Sept. 14, 1920.

Application filed May 7, 1917. Serial No. 166,941.

*To all whom it may concern:*

Be it known that I, EDWARD A. FRIES, a citizen of the United States, and resident of Boston, in the county of Suffolk and State of Massachusetts, have invented new and useful Improvements in Machines for Turning Plastic Material, of which the following is a specification.

This invention relates to a machine for turning articles from a continuous bar or rod of plastic material, and particularly for turning and forming blanks automatically from a bar or rod of clay for manufacturing porcelain spark plugs, electric insulators, plumbing fittings, and the like.

The invention consists in certain improvements upon and additions to the clay turning machine shown in application for Letters Patent filed by Lillian L. Randall and Edward A. Fries, June 12, 1916, Serial No. 103,081. These improvements have to do chiefly with the mechanism for controlling the boring tool and the counterboring, facing or end-forming tool, and the mechanism for transferring the finished article and delivering it out of the machine without the danger of marring or breaking the article which exists when it is merely dropped from the machine after completion.

In the accompanying drawings,—

Figure 1 is a side elevation of the machine, parts being broken away and parts being shown in section;

Fig. 2 is a plan view of the machine, parts being broken away;

Fig. 3 is an end elevation of the machine viewed from the right of Figs. 1 and 2;

Fig. 4 is a detail in end elevation showing the receiving and delivering cradle for the finished article; and Fig. 5 is a similar detail showing the cradle in another position.

1 represents the base or bed plate of the machine and 2 is an upright having a bearing 3 at its top in which turns a hollow spindle 4 rotated from any suitable source of power by a pulley 5. The clay bar C is supported in and rotated by the hollow spindle 4 with its forward end projecting into position for being acted upon by the several tools hereinafter described.

The mechanism for intermittently feeding the bar C forward after the completion of each article may be the same as set forth in the said former application of Randall & Fries. The bar C is shown in Fig. 1 projecting into position ready for the turning and forming operations.

The hollow broach 6, having at its forward end a circular cutting edge for forming a bore through the center of the work, is mounted in a tool head 7. The tool head 7 is provided with a base or foot $7^a$ which travels in a slideway 8, so that the tool head and broach 6 may slide transversely of the machine. The slideway 8 is carried by a main slide 9 which slides lengthwise of the machine in ways 10, 10, at the top of uprights 11, 11, bolted to the base 1. The slide 9 carrying the tool head and other parts mounted thereon, is reciprocated endwise of the machine by cam drum 12 on shaft 13, one end of which is journaled in bearings on upright 14 and the other end of which is journaled in bearings on the upright 2. The slide 9 is moved forward toward the work by a cam lead 15 on drum 12, and is retracted by cam lead 16, said cam leads coöperating with a cam follower $9^a$ on the bottom of slide 9.

The tool head 7 and the parts carried thereby are reciprocated crosswise of the machine by link 17 which is connected to the end of the sliding foot $7^a$ by a universal joint 18. Link 17 is pivoted at 19 to arm 20 of a bell crank lever, the other arm of which, 21, has a cam following roller 22. The bell crank lever is journaled at 23 to rock on the top of upright 24. The cam follower 22 is actuated by cam 25 on shaft 26 journaled in the uprights 27.

The tool head 7 is made hollow and has mounted therein a tool holder 28 which turns in ball bearings 29. The tool holder 28 will be held stationary so long as the tongue 30 forming a clutch member on the rear of the tool holder engages a slot in the face of the other clutch member 31. The clutch member 31 has a square stem 32 which slides in a square hole 33 in the head 7. A spring 34 normally presses the clutch member 31 forward.

In Fig. 1, the parts controlling the broach or boring tool 6 are shown in the position they will occupy at the beginning of the stroke.

When slide 9 moves forward the clutch will be disengaged by latch 35 mounted to slide in the top of the tool head 7, the lower end of which latch is beveled so that when pushed downward it moves the clutch member 31 rearwardly out of engagement with the tongue 30 on the tool holder 28, thus permitting the tool holder to turn freely in the tool head 7. The upper end of latch 35 is also beveled and coöperates with the cam blocks or cam plates 36 to press the latch 35 inward and disengage the clutch as described holding it disengaged during the first part of the stroke. The cam plates or latch actuating members 36 are adjustably and removably fastened by screws to a support 37, which in turn is adjustably bolted to arm 38. The arm 38 is made in one casting with part 39 the end of which is bolted to the top of upright 2. Thus the time when the clutch is engaged and disengaged may be varied by adjusting the cam plates 36, and the length of travel during which the clutch will be engaged or disengaged may be varied by removing or adding plates 36.

When the latch 35 passes off cam plates 36 the clutch 31 is again allowed to engage the tool holder 28 so that the tool or broach 6 will again be held stationary for a short time, while the end-forming tool 6ª acts on the end of the clay stock. The tool 6ª may be any kind of end-forming tool, such as a counterboring tool, an end-facing tool, or an end-shaping tool. In the form shown in the drawings a counterboring tool is used by way of illustration. After the counterboring or other end-forming operation has been performed on the stock, the latch 35 will engage and be actuated by cam plate 36ª and again disengage the clutch, permitting the tool to turn with the work.

It will be seen that the time when the clutch is disengaged and reëngaged and the distance for which it will be held in either condition may be easily regulated by the adjustment and the number of the cam plates 36, 36ª.

The forward turning or forming tool for shaping or turning the outside of the forward part of the clay bar C is shown at 40, mounted in a holder 41 which has a dovetail slide 42 reciprocating vertically in a correspondingly shaped slideway in the arm 39. A spring 43 between the bottom of the tool holder 41 and a flange or lug 44 formed on arm 39 normally tends to hold the tool holder and tool 40 in elevated position. The tool holder and tool are moved downward to make the cutting stroke by cam 45 fixed on shaft 46 which is mounted in suitable bearings (not shown) on the machine frame. Cam 45 acts on cam roller 47 journaled at the top of the sliding tool holder 41.

The rear part of the article to be turned from the clay bar C is formed by the rear forming tool 48 which is fastened by a set screw 49 in a tool holder 50. The tool holder 50 slides transversely of the machine in horizontal slideways in the frame 51 which is cast solid with upright 2. The sliding tool holder 50 and the tool 48 are moved forward to make their cutting stroke by cam 52 acting on roller 50ª journaled on slide 50, while the tool holder 50 is retracted by spring 53. The slide 50 and spring 53 are substantially similar in construction to the slide 41 and spring 43. The cam 52 is fixed to shaft 54 suitably journaled in uprights 27.

The cutting off tool for severing the finished article from the clay bar is shown at 55. This tool is mounted in a vertically sliding holder 56 which reciprocates in slide ways provided therefor in arm 39. Spring 57 normally urges the cutting off tool 55 to inoperative position in the same way as in the other tools and tool carriers, while cam 58 on shaft 46 moves the cutting off tool forward or downward for its operating stroke through cam following roller 59 journaled at the top of tool holder 56.

At one side of the machine is a cradle 60 in the form of a trough adapted to receive the finished article. The cradle 60 is supported to rock on a pivot pin 61 mounted at the top of a vertical slide 62 which moves up and down in a fixed housing 63 supported on the machine base. Pins 64, one on each side, project from the slide 62 through slots in the sides of housing 63. A lever 65 made with a forked end 66 which engages pin 64 is fulcrumed on shaft 67 at the top of uprights 68. The lever 65 has a rearwardly extending arm 69 which is actuated by a cam 70 on shaft 13 to raise the slide 62 and the cradle 60. The cradle and its slide drop by gravity when the cam 70 passes off from arm 69.

Another lever 71 on shaft 67 coöperates with a roller 72 on an arm 73 extending downwardly from the cradle 60 below the pivot 61 to rock the cradle 60 for the purpose of discharging or dumping the finished article in the manner hereinafter described. The lever 71 has a rearwardly extending arm 74 actuated by cam 75 on shaft 13. A coil spring 76 surrounding pivot pin 61 normally urges the cradle toward its upright position. A receiving belt 78 (Fig. 5)

mounted on rollers or pulleys 77 extends lengthwise of the machine alongside of the cradle 60 to receive the finished article A deposited thereon by the cradle.

The shaft 13 is the main driving shaft of the machine, and from it the other cam shafts derive their motions, shaft 13 being belted or chained to shaft 26, shaft 26 to shaft 54, and shaft 54 to shaft 46, as indicated by broken lines in Fig. 3.

The operation of the machine is as follows:

The plastic clay bar C which has been fed through the hollow spindle 4 by suitable mechanism, such as shown in the aforesaid joint application of Randall and Fries, projects into the region of the tools in position to be acted upon by the tools as shown in Fig. 1.

Starting with the machine in this position with the end of the clay bar C in position to be formed, the first part of the rotation of cam drum 12 acting through cam lead 15 and the cam follower 9ª moves the main slide 9 forward. The latch 35 thereupon disengages the clutch 31 as already described, and permits the broach 6 to turn freely in the tool head 7. As broach 6 enters the end of the plastic clay bar C which is being rotated by the hollow spindle 4 by means of pulley 5, the broach will turn with the clay stock thus avoiding friction between the tool and the stock, and so avoiding breaking or injuring the clay. The clay bar C will have a previously formed central hole through it of smaller diameter than the broach 6, so that the broach 6 upon being pushed into the bar without relative rotation will cut the central bore of the clay bank to a size corresponding to the diameter of the broach. After the tool 6 has entered a short distance,—far enough to give the bar some support for the action of the forming tools,— the forward forming tool 40 moves forward actuated by cam 45 to turn and form the forward part of the article. Shortly before the tool 40 completes its stroke cam 52 moves the rear forming tool 48 inward to form the rear part of the finished article. In the meantime broach 6 has been advancing, and just before the counterboring or other end-forming tool 6ª reaches the end of bar C the latch 35 slips off the end of the last cam plate 36 allowing clutch 31 to reëngage tool holder 28, thereby stopping the rotation of the tool 6. As the tool 6 continues to advance the rotating bar C will be cut at the end by the non-rotating counterboring or end-forming tool 6ª to a depth corresponding to the spacing between the cam plates 36 and 36ª. When the latch 35 reaches plate 36ª the clutch will be again disengaged, permitting the broach to turn with the stock.

Before the forming tools and the broach complete their travel, the cutting off tool 55 starts to feed inward or downward actuated by cam 58 to cut off the finished article A which has now been turned and shaped exteriorly by the forming tools 40 and 48 and bored and shaped by the tools 6 and 6ª.

The front forming tool 40 completes its stroke first, then the rear forming tool 48, then the broach and end-forming tool, and finally the cutting off tool, although this precise order of events is not indispensable.

After the article A is completely formed and severed from the bar, and while the broach 6 is still in position in the bore and supports the article A, and while the lengthwise reciprocating slide 9 is in its forwardmost position, the transverse slide 7ª carrying the tool head 7 is moved across the machine to the left as viewed in Fig. 3 by the cam 25 acting through link 17, until the finished article A supported on broach 6 is directly above the receiving cradle 60. At this time the cradle 60 and its slide 62 are in their lowermost position in the housing 63. Thereupon cam 70 acting upon arm 69 swings lever 65 upwardly, lifting the cradle 60 to the position shown in Fig. 4, in engagement with or close to the finished article A held on broach 6. The cradle is thus held lifted while the broach is withdrawn by cam lead 16 on cam drum 12, which now comes into action. The end wall of the cradle engages the end of the finished article A and holds it in the cradle while the broach is drawn out.

The cam follower 22 then passes off cam 25 and the slide 7ª and tool head 7 are retracted by spring 21ª acting on bell crank lever 21, thus restoring the tool head 7 to its original position in the center of the machine through the connecting link 17. After the broach has been withdrawn from the article A the cradle 60 carrying the finished article is permitted to drop when cam 80 moves off from arm 69. The lever 71 which is now in engagement with roller 72 at the bottom of the cradle is lifted by cam 75, acting upon arm 74, thereby tilting or rocking the cradle to the position shown in Fig. 5, whereupon the finished article A will roll out of the cradle on to the receiving belt 78 and be carried away. Cam 75 then passes off from arm 74 and the cradle is restored to its upright position by spring 76 (Fig. 1). The cycle is now complete and the parts are in position to start on a similar series of operations on a new end of clay bar C which has now been advanced into position to be turned and formed.

I claim:

1. A turning machine of the character described, comprising a rotary hollow shaft adapted to support and rotate a bar of plastic material to be operated upon, a carrier for bore forming and end-forming tools movable axially of the hollow spindle, a bore forming tool and an end-forming tool both rotatable on said carrier, and means controlled by the forward movement of said carrier to hold the end-forming tool against rotation during its operation and to permit the same to rotate with the work at the end of its operating stroke.

2. A turning machine of the character described, comprising a rotary hollow shaft adapted to support and rotate a bar of plastic material to be operated upon, a carrier for bore forming and end-forming tools movable axially of the hollow spindle, a bore forming tool rotatable in said carrier, an end-forming tool fixed to the bore-forming tool, and means controlled by the forward movement of said carrier to permit the bore forming and end-forming tools to rotate with the work during part of the working stroke of the bore forming tool and to hold said tools against rotation while the end-forming tool is in operation.

3. A turning machine of the character described, comprising a rotary hollow shaft adapted to support and rotate a bar of plastic material to be operated upon, a carrier for bore forming and end-forming tools movable axially of the hollow spindle, a bore forming tool rotatable in said carrier, an end-forming tool fixed to the bore forming tool, and means controlled by the forward movement of said carrier to permit the bore forming and end-forming tools to rotate with the work during part of the working stroke of the bore forming tool and to hold said tools against rotation while the end-forming tool is in operation, and again to permit said tools to rotate with the work at the end of the working stroke of said tools.

4. A machine of the character described, comprising a tool carrier movable axially of the work, a tool rotatably supported by said tool carrier, means to hold said tool against rotation and to release it for rotation, and means to vary the periods at which the tool is free to rotate and is held against rotation, during the axial movement of the tool carrier.

5. A machine of the character described, comprising a tool carrier movable axially of the work, a tool rotatably supported by said tool carrier, a clutch to hold said tool against rotation and to release it for rotation, and means to vary the times of engagement and disengagement of said clutch during the axial movement of the tool carrier.

6. A machine of the character described, comprising a tool carrier movable axially of the work, a tool rotatably supported by said tool carrier, a clutch to hold said tool against rotation and to release it for rotation, a latch to actuate said clutch, and an adjustable latch actuating member to control the engagement and disengagement of said clutch.

7. A machine of the character described comprising a tool carrier movable axially of the work, a tool rotatably supported by said tool carrier, means to hold said tool against rotation and to release it for rotation, and means to control said holding and releasing means, said controlling means being adapted to release the tool for rotation during part of its forward movement, then to hold said tool against rotation during part of its forward movement, and thereafter again to release it for rotation.

8. A machine of the character described, comprising a tool carrier movable axially of the work, a tool rotatably supported by said tool carrier, a clutch to hold said tool against rotation and to release it for rotation, a latch to actuate said clutch, and a plurality of juxtaposed latch-actuating members, one or more of which are removable, adapted to control the engagement and disengagement of said clutch.

9. A machine of the character described, comprising a tool carrier movable axially of the work, a tool rotatably supported by said tool carrier, a clutch to hold said tool against rotation and to release it for rotation, a latch to actuate said clutch, and a plurality of juxtaposed adjustable latch-actuating members, one or more of which are removable, adapted to control the engagement and disengagement of said clutch.

10. A machine of the character described, comprising a tool carrier movable axially of the work, a tool rotatably supported by said tool carrier, a clutch to hold said tool against rotation and to release it for rotation, a latch to actuate said clutch, and a plurality of latch-actuating members spaced apart, adapted to control the engagement and disengagement of said clutch.

11. A machine of the character described, comprising a tool carrier movable axially of the work, a tool rotatably suported by said tool carrier, a clutch to hold said tool against rotation and to release it for rotation, a latch to actuate said clutch, and a plurality of adjustable latch-actuating members some of which are spaced apart and some of which are juxtaposed, adapted to control the engagement and disengagement of said clutch.

12. A turning machine of the character described, comprising means to support and rotate the material to be formed, means to form the outside of the work, a bore forming tool and a carrier on which said tool is mounted, said carrier being movable lengthwise of the work to advance the tool into the work and also being movable crosswise of the work with the bore forming tool in the turned article to transfer the turned article away from the turning mechanism.

13. A turning machine of the character described, comprising means to support and rotate the material to be formed, means to form the outside of the work, a bore forming tool and a carrier on which said tool is mounted, said carrier being movable lengthwise of the work to advance the tool into the work and also being movable crosswise of the work with the bore forming tool in the turned article to transfer the turned article away from the turning mechanism, and a receiver to receive the article so transferred.

14. A turning machine of the character described, comprising means to support and rotate the material to be formed, means to form the outside of the work, a bore forming tool and a carrier on which said tool is mounted, said carrier being movable lengthwise of the work to advance the tool into the work and also being movable crosswise of the work with the bore forming tool in the turned article to transfer the turned article away from the turning mechanism, a receiver movable up and down, and means to elevate the receiver into proximity to the turned article to receive the same when it has been so transferred.

15. A turning machine of the character described, comprising means to support and rotate the material to be formed, means to form the outside of the work, a bore forming tool and a carrier on which said tool is mounted, said carrier being movable lengthwise of the work to advance the tool into the work and also being movable crosswise of the work with the bore forming tool in the turned article to transfer the turned article away from the turning mechanism, a receiver to receive the article so transferred, and mechanism to withdraw the bore forming tool from the article to deposit the same on the receiver.

16. A turning machine of the character described, comprising means to support and rotate the material to be formed, means to form the outside of the work, a bore forming tool and a carrier on which said tool is mounted, said carrier being movable lengthwise of the work to advance the tool into the work and also being movable crosswise of the work with the bore forming tool in the turned article to transfer the turned article away from the turning mechanism, a receiving cradle to receive the article so transferred and means to rock said cradle to discharge the article therefrom.

17. A turning machine of the character described, comprising means to support and rotate the material to be formed, means to form the outside of the work, a bore forming tool and a carrier on which said tool is mounted, said carrier being movable lengthwise of the work to advance the tool into the work and also being movable crosswise of the work with the bore forming tool in the turned article to transfer the turned article away from the turning mechanism, a receiving cradle to receive the article so transferred, means to elevate the cradle into proximity to the turned article to receive the same when it has been so transferred, and means to rock said cradle to discharge the article therefrom.

18. A turning machine of the character described, comprising means to support and rotate the material to be formed, means to form the outside of the work, a bore forming tool and a carrier on which said tool is mounted, said carrier being movable lengthwise of the work to advance the tool into the work and also being movable crosswise of the work with the bore forming tool in the turned article to transfer the turned article away from the turning mechanism, a receiving cradle to receive the article so transferred, means to elevate the cradle into proximity to the turned article to receive the same when it has been so transferred and to lower the cradle, and means to rock the cradle while it is being lowered to discharge the article therefrom.

19. A turning machine of the character described, comprising means to support and rotate the material to be formed, means to form the outside of the work, a bore forming tool and a carrier on which said tool is mounted, means to move said carrier forward to advance the tool into the work, means to shift the carrier crosswise of the work with the tool in the turned article to transfer the turned article away from the turning mechanism, a receiver to receive the article so transferred, means to retract the carrier while in its shifted position to withdraw the tool from the article, and means to shift the retracted carrier back to its initial position.

20. A turning machine of the character described, comprising means to support and rotate the material to be formed, means to form the outside of the work, a bore forming tool and a carrier on which said tool is mounted, means to move said carrier forward to advance the tool into the work, means to shift the carrier crosswise of the work with the tool in the turned article to transfer the turned article away from the turning mechanism, a receiving cradle movable up and down, means to elevate the receiving cradle into position to receive the article so transferred, means to retract the carrier while in its shifted position to withdraw the tool from the article, and means to shift the retracted carrier back to its initial position.

21. A turning machine of the character described, comprising means to support and rotate the material to be formed, means to form the outside of the work, a bore forming tool and a carrier on which said tool is mounted, means to move said carrier forward to advance the tool into the work, means to shift the carrier crosswise of the work with the tool in the turned article to transfer the turned article away from the turning mechanism, a receiving cradle movable up and down, means to elevate the receiving cradle into position to receive the article so transferred, means to retract the carrier while in its shifted position to withdraw the tool from the article, means to rock the cradle to discharge the article therefrom, and means to shift the retracted carrier back to its initial position.

Signed by me at Boston, Massachusetts, this 26th day of April 1917.

EDWARD A. FRIES.